UNITED STATES PATENT OFFICE 2,513,140

3-THIENYLACETIC ACID

Ernest E. Campaigne and William M. Le Suer, Bloomington, Ind., assignors to Indiana University Foundation, Monroe County, Ind., a corporation of Indiana No Drawing. Application November 28, 1947, Serial No. 788,663

2 Claims. (Cl. 260—329)

The present invention relates to the 3-thienylacetic acid, and is more particularly concerned with a method for the preparation thereof from 3-thenyl bromide. The invention is further concerned with the novel product of the reaction, 3-thienylacetic acid, having the following structural formula:

It is an object of the present invention to provide the novel compound, 3-thienylacetic acid, a white crystalline solid having a melting point of about 79 to 80 degrees centigrade, which is a valuable intermediate in the preparation of more complex organic compounds having utility as pharmaceuticals, such as aminoalkyl esters of 3-thienylacetic acid. An additional object of the invention is the provision of a novel two-step process for the preparation of 3-thienylacetic acid by the reaction of 3-thenyl bromide and an alkali metal cyanide, and subsequent hydrolysis of the nitrile to the acid. Other objects of the invention will become apparent hereinafter.

The method of the present invention essentially comprises conversion of 3-thenyl bromide to 3-thenylacetonitrile and subsequent hydrolysis of the nitrile to the desired 3-thienylacetic acid.

The preparation of the starting 3-thenyl bromide may be accomplished by the reaction of 3-methylthiophene and N-bromosuccinimide in the presence of a small amount of benzoyl peroxide catalyst, according to the procedure more fully disclosed in our co-pending application Serial 788,664, filed concurrently herewith, now Patent 2,471,091, in which the preparation of 3-thenyl bromide and the compound per se are claimed subject matter.

The conversion of the starting 3-thenyl bromide to the 3-thienylacetonitrile may be conveniently accomplished by mixing together equimolar proportions of 3-thenyl bromide and an alkali metal cyanide, e. g., sodium cyanide or potassium cyanide. Other proportions of reactants may be employed, but no additional advantage is gained thereby. The reaction may be conducted in an aqueous-alcohol solvent, and solvents such as ethanol, acetone, and Methyl Cellosolve are suitable. A temperature between about 20 degrees and about 130 degrees centigrade may be employed for the reaction, with the reflux temperature of the particular solvent employed being considered desirable for most rapid reaction. The 3-thenyl bromide may be conveniently dissolved in alcohol and the alcohol solution added dropwise and with stirring to a sodium cyanide-alcohol mixture. After completion of the desired reaction period, e. g., 1 to 5 hours, the alkali metal bromide may be removed by filtration and the intermediate 3 - thienylacetonitrile separated therefrom. Preferably, however, the filtrate from the first step may be preserved without separation of the intermediate product, and made basic with a suitable base, e. g., potassium hydroxide, sodium hydroxide, et cetera. The alkaline solution may then be heated, as at the reflux temperature, for a period of time sufficient to convert substantially all of the nitrile to the acid, usually between about three and fifteen hours. The alcohol or other solvent may then be removed by distillation, the basic solution extracted with ether, and the aqueous layer acidified, e. g., with concentrated hydrochloric acid. The desired 3-thienylacetic acid separates as an oil and may be extracted with ether, dried, and the ether removed on a steam bath. Other conventional methods of separation and purification may be used if desired, and will also be found suitable.

The following example is given to illustrate the practice of the present invention, but is not to be construed as limiting.

Eighty-eight and one-half grams (0.5 mole) of N-bromo-succinimide and 0.2 gram of benzoyl peroxide were added to a solution of 55 grams (0.56 mole) of 3-methylthiophene in 150 milliliters of carbon tetrachloride. The reaction flask was shaken vigorously to disperse the peroxide and heating was commenced. An additional 0.2 gram of benzoyl peroxide was added to the flask during the first ten minutes of heating, and the flask and contents were shaken vigorously during the first hour of heating. After an additional five hours of refluxing, the flask was cooled in an ice-bath, succinimide removed by suction filtration and washed with carbon tetrachloride. The wash was then added to 50 milliliters of the main carbon tetrachloride solution, together with the solution from an identical run, prior to removal of solvent by distillation under reduced pressure. The highly lachrymatory oil which remained was distilled under vacuum and 114 grams of light tan oil collected at 60–100 degrees centigrade under two millimeters of mercury pressure. This material darkened slowly upon standing. Purification yielded a sample boiling at about 75–78 degrees centigrade at one millimeter of mercury pressure absolute; $d_4^{20}$ 1.635, $N_D^{20}$ 1.604.

A mixture of 100 milliliters of water, 100 milliliters of ethanol, and 15 grams (0.3 mole) of sodium cyanide was heated to refluxing and a solution of 54 grams of 3-thenyl bromide dissolved in 50 milliliters of ethanol added dropwise with stirring thereto. The addition required one hour and refluxing was continued for three additional hours. The sodium bromide was removed by filtration. To the alcoholic filtrate was added 30 grams of potassium hydroxide. The solution was heated to reflux for fifteen hours, whereafter the alcohol was removed by distillation. The basic solution was extracted with ether and the aqueous layer acidified with concentrated hydrochloric acid. The acid separated as an oil which was extracted with ether, the ether solution dried, and the ether removed on a steam bath. The acid crystallized on standing. This material, the desired 3-thienylacetic acid, was recrystallized from high-boiling petroleum ether as white leaflets, M. P. 79–80 degrees centrigrade.

Various modifications may be made in the present invention without departing from the spirit or scope thereof, and it is to be understood that we limit ourselves only as defined in the appended claims.

1. A compound selected from the group consisting of 3-thienylacetonitrile and 3-thienylacetic acid.

2. 3-thienylacetic acid, of the formula:

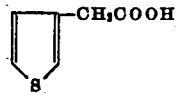

ERNEST E. CAMPAIGNE.
WILLIAM M. LE SUER.

REFERENCES CITED

The following references are of record in the file of this patent:

UNITED STATES PATENTS

| Number | Name | Date |
|---|---|---|
| 2,425,721 | Blicke | Aug. 19, 1947 |

OTHER REFERENCES

Weygand, "Organic Preparations," page 161, Interscience Pub., New York, 1945.